(12) United States Patent
Eastham (10) Patent No.: US 8,302,745 B2
(45) Date of Patent: Nov. 6, 2012

(54) BACKING PLATE AND METHOD OF MAKING

(75) Inventor: Roy Eastham, Highland, MI (US)

(73) Assignee: Honeywell International Inc., Morristown, NJ (US)

( * ) Notice: Subject to any disclaimer, the term of this patent is extended or adjusted under 35 U.S.C. 154(b) by 849 days.

(21) Appl. No.: 11/961,670

(22) Filed: Dec. 20, 2007

(65) Prior Publication Data
US 2008/0156600 A1   Jul. 3, 2008

Related U.S. Application Data

(60) Provisional application No. 60/871,068, filed on Dec. 20, 2006.

(51) Int. Cl.
| | |
|---|---|
| F16D 65/38 | (2006.01) |
| F16D 65/12 | (2006.01) |
| F16D 65/00 | (2006.01) |
| F16D 65/04 | (2006.01) |
| F16D 69/00 | (2006.01) |
| F16D 65/847 | (2006.01) |
| B61H 5/00 | (2006.01) |
| B21B 13/22 | (2006.01) |
| B21B 1/46 | (2006.01) |
| B22D 11/126 | (2006.01) |
| B22D 11/128 | (2006.01) |
| B22D 19/00 | (2006.01) |
| B23P 17/00 | (2006.01) |
| B23P 25/00 | (2006.01) |
| B22C 13/04 | (2006.01) |

(52) U.S. Cl. ............ 188/250 E; 188/264 A; 188/73.37; 29/527.5; 29/527.1; 164/98; 164/113

(58) Field of Classification Search ............... 188/250 E, 188/250 B, 250 H, 250 C, 261, 264 A, 258, 188/73.35–73.37; 29/527.1, 527.5; 164/98, 164/113
See application file for complete search history.

(56) References Cited

U.S. PATENT DOCUMENTS

| | | | | |
|---|---|---|---|---|
| 3,022,877 A | * | 2/1962 | Fawick | 192/85.13 |
| 3,439,780 A | * | 4/1969 | Frigger | 188/106 F |
| 4,036,333 A | * | 7/1977 | Mathauser | 188/264 A |
| 5,040,589 A | | 8/1991 | Bradley et al. | |

(Continued)

FOREIGN PATENT DOCUMENTS

JP   07-158673 A   6/1995

(Continued)

OTHER PUBLICATIONS

International Search Report Dated May 15, 2008, International Application No. PCT/US2007/088399.

(Continued)

*Primary Examiner* — Bradley King
*Assistant Examiner* — Vishal Sahni
(74) *Attorney, Agent, or Firm* — Alston & Bird LLP (57) ABSTRACT

A backing plate comprises a front side configured to engage a friction material, a rear side opposite the front side, a first edge, a second edge generally opposing the first edge, and at least one channel disposed between the front side and the rear side and extending from the first edge toward the second edge. The rear side is configured to engage a caliper assembly. The backing plate is configured to achieve a resonant frequency that attenuates vibration.

15 Claims, 7 Drawing Sheets

U.S. PATENT DOCUMENTS

| | | |
|---|---|---|
| 5,985,208 A | 11/1999 | Zedalis et al. |
| 5,993,507 A | 11/1999 | Baum et al. |
| 6,122,951 A * | 9/2000 | Arbesman ................. 72/377 |
| 6,206,151 B1 * | 3/2001 | Nakamura ............. 188/250 B |
| 6,474,453 B2 * | 11/2002 | Sano .................... 188/251 A |
| 6,669,898 B2 | 12/2003 | Gressel et al. |
| 6,676,895 B2 | 1/2004 | Kuhns |
| 6,739,379 B2 | 5/2004 | Kono |
| 6,745,818 B1 | 6/2004 | Fan et al. |
| 6,787,899 B2 | 9/2004 | Rinella et al. |
| 6,942,006 B2 | 9/2005 | Kono |
| 7,017,645 B2 | 3/2006 | Johnson et al. |
| 2006/0266599 A1 * | 11/2006 | Denys et al. ............... 188/73.37 |

FOREIGN PATENT DOCUMENTS

| | | |
|---|---|---|
| JP | 13-227570 A | 8/2001 |
| JP | 14-106614 A | 4/2002 |
| JP | 17-024030 A | 1/2005 |

OTHER PUBLICATIONS

Written Opinion of International Searching Authority Dated May 15, 2008, International Application No. PCT/US2007/088399.

* cited by examiner

FIG. 7B

BACKING PLATE AND METHOD OF MAKING

CROSS REFERENCE TO RELATED APPLICATIONS

This application claims the benefit of U.S. Provisional Patent Application Ser. No. 60/871,068, filed Dec. 20, 2006, the contents of which are incorporated herein by reference thereto.

BACKGROUND

Exemplary embodiments of the present application relate to brake pads for motor vehicle brake systems, and more specifically to backing plates for brake pads.

Generally, in motor vehicle wheel brakes, braking friction is caused by a set of brake pads that press against the inner surface of the surface of a rotating disc or drum that is connected to a rotating wheel of a vehicle. Thus, brake pads play an important role in the braking systems for all types of automobiles or vehicles equipped with disc or drum brakes. Brake pads, mounted in a brake caliper assembly and located at the wheels, typically comprise a backing plate having a friction material disposed thereon wherein the friction material makes contact with the rotating surface of the wheel (that is, a rotor or a drum).

As a vehicle travels, the rotor or drum rotates with the wheels of the vehicle. The brake caliper assemblies, having brake pistons, are rigidly mounted to a non-rotating component of the vehicle, such as the vehicle's frame. Upon application of the brake pedal, hydraulic fluid drives the brake pistons outward from cylinders in the caliper assemblies, thereby forcing the brake pads to engage the rotating braking surface. The vehicle is resultantly slowed as the frictional braking forces created between the brake pads and the braking surface oppose the rotation of the wheel and convert the vehicle's kinetic energy to heat.

During braking, however, the braking surface excites the brake pads, causing the brakes to vibrate and transmitting some of the vehicle's kinetic energy into sound and vibration, which are undesirable byproducts. The brake pads can also be excited by other stimuli, such as the vehicle drive train components that transmit energy to the brake pads that causes them to vibrate. By transmitting the vibrations through the surrounding air or through the structure of the vehicle, vibrating braking plates can generate noise that is audible to vehicle occupants. This noise can take the form of a particularly annoying squeal otherwise known as "brake squeal".

The brake pads may also excite other components, causing them to vibrate and thereby emit undesirable noise. When the squealing phenomenon arises, not only do vibrations of the braking surface and of the brake pad occur, the various components of the brake vibrate in resonance, influencing one another. In other words, a chain of vibrating elements is established, starting from the disk and passing through the pads and the caliper body until it also involves the suspension of the vehicle and the vehicle body itself. Each element making up the brake assembly vibrates at its own natural frequency.

Accordingly, it is desirable to provide a backing plate for a brake pad that diminishes the adverse effects of the vibrational forces passing by the brake pad.

SUMMARY

Exemplary embodiments of the present invention are related to a backing plate that comprises a front side configured to engage a friction material, a rear side opposite the front side, a first edge, a second edge generally opposing the first edge, and at least one channel disposed between the front side and the rear side and extending from the first edge toward the second edge. The rear side is configured to engage a caliper assembly. The backing plate is configured to achieve a resonant frequency that attenuates vibration.

Exemplary embodiments of the present invention are also related to a method of manufacturing a backing plate that comprises forming a backing plate of the type having a planar front side configured to engage a friction material, a rear side configured to engage a caliper assembly, a first edge, and an second edge opposing the first edge through a metal injection molding process, wherein a plurality of channels are integrally formed between the front side and the rear side and extend from the first edge toward the second edge. Exemplary embodiments are also related to backing plate manufactured by this method.

The above-described and other features and advantages of the present application will be appreciated and understood by those skilled in the art from the following detailed description, drawings, and appended claims.

BRIEF DESCRIPTION OF DRAWINGS

FIG. 1c is an enlarged view of a portion of FIG. 1a;

FIG. 3b is an enlarged view of a portion of FIG. 3a;

FIG. 4b is an enlarged view of a portion of FIG. 4a;

DESCRIPTION OF EXEMPLARY EMBODIMENTS

While the specification concludes with claims defining the features of the invention that are regarded as novel, it is believed that the invention will be better understood from a consideration of the description of exemplary embodiments in conjunction with the drawings. It is of course to be understood that the embodiments described herein are merely exemplary of the invention, which can be embodied in various forms. Therefore, specific structural and functional details disclosed in relation to the exemplary embodiments described herein are not to be interpreted as limiting, but merely as a representative basis for teaching one skilled in the art to variously employ the present invention in virtually any appropriate form. Furthermore, the terms and phrases used herein are not intended to be limiting but rather to provide an understandable description of the invention. Moreover, the particular dimensions illustrated in the accompanying drawings are provided as non-limiting exemplary embodiments, and it is contemplated that the dimensions may be increased, decreased, and otherwise varied as desired in accordance with exemplary embodiments of the present invention.

Exemplary embodiments of the present invention can be implemented to adjust the natural or resonant frequency at which brake backing plates tend to vibrate, and thereby may operate to reduce the noise created by a vehicle brake system. In exemplary embodiments, the resonant frequency is moved away from the frequencies of excitation of such sources as the rotor or drum and vehicle drive train components. The resonant frequency of a backing plate is adjusted by manipulating the geometry and mass of the backing plate to include a plurality of radially vent channels, and further by adjusting the number, size, shape, spacing and location of the radially vent channels. The resulting backing plate exhibits improved vibrational control. Moreover, in exemplary embodiments, a reduction in mass provides additional benefits such as reducing material costs as well as the overall weight of the component.

Referring now to FIGS. 1-4, various exemplary embodiments of a backing plate in accordance the present invention is illustrated. The backing plate, indicated generally at 10, includes opposite, generally planar front and rear sides 12, 14 and a plurality of vent channels 16 disposed therethrough.

In the present exemplary embodiment, front side 12 of backing plate 10 has a surface 24 configured to engage a friction lining (not shown). When affixed, the friction lining may extend beyond front side 12 of backing plate 10. In exemplary embodiments, the material used for the friction lining can be any suitable heat-resistant material adapted to interface with associated braking surfaces (for example, rotors or drums (not shown)) during braking to generate frictional forces that operate to stop or slow the vehicle.

Figure 3:
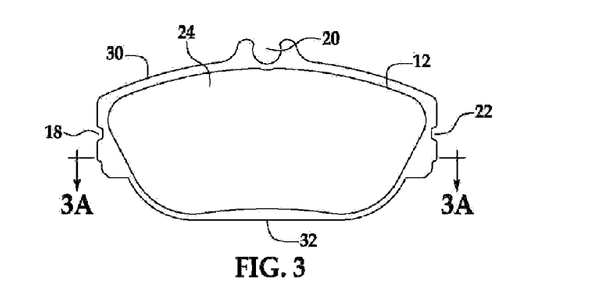
FIG. 3 is a plain view of the front surface of a backing plate in accordance with an exemplary embodiment of the present invention.
Figure 3A:
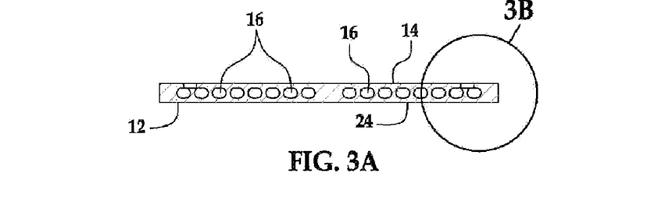
FIG. 3a is a cross sectional view along lines 3a-3a of FIG. 3.
Figure 4:
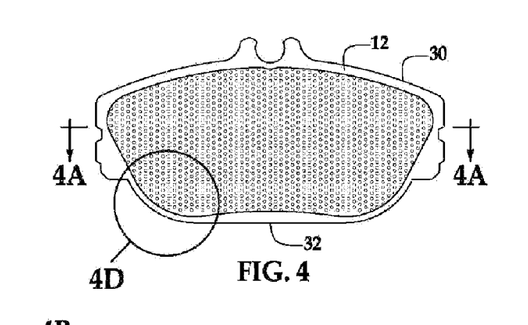
FIG. 4 is a plain view of the front surface of a backing plate in accordance with another exemplary embodiment of the present invention.
Figure 4A:
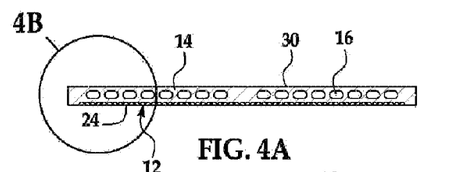
FIG. 4a is a cross sectional view along lines 4a-4a of FIG. 4.
Figure 4B:
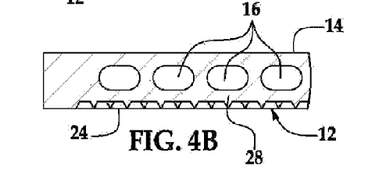
Figure 4C:
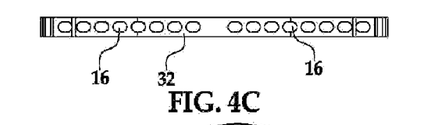
FIG. 4c is a view along lines 4c-4c of FIG. 4.
Figure 4D:
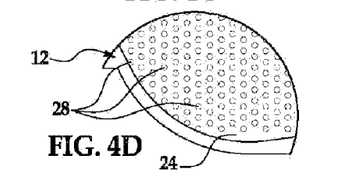
FIG. 4d is enlarged view of a portion of FIG. 4

In the present exemplary embodiment, surface 24 consists of a suitable number of protrusions, bosses, hooks or any other equivalent features 28 located on surface 24, that comprise one of a variety of suitable ways of attaching a friction lining to a backing plate. In exemplary embodiments, the backing plate could also be coated with an adhesive to secure the friction material thereto. The number of protrusions, bosses, hooks or other features can vary according to the size of the backing plate and the strength of the bond required, which, in turn, can vary according to the type of vehicle.

Figure 1:
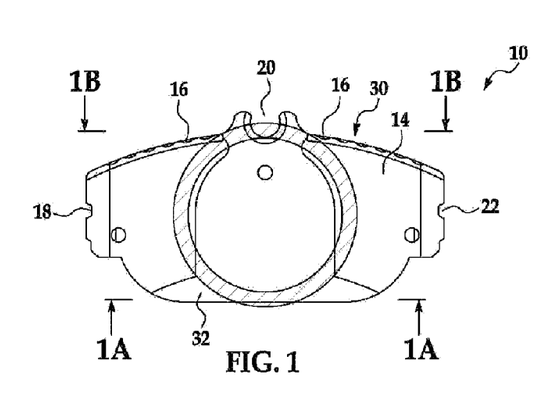
FIG. 1 is a plain view of the rear surface of a backing plate in accordance with an exemplary embodiment of the present invention.
Figure 1A:
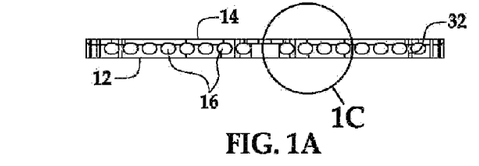
FIG. 1a is a view along lines 1a-1a of FIG. 1.
Figure 1B:
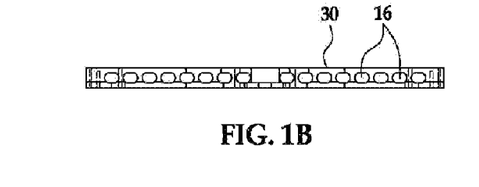
FIG. 1b is a view along lines 1b-1b of FIG. 1.
Figure 1C:
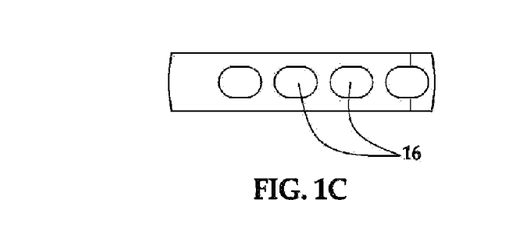
Figure 2:
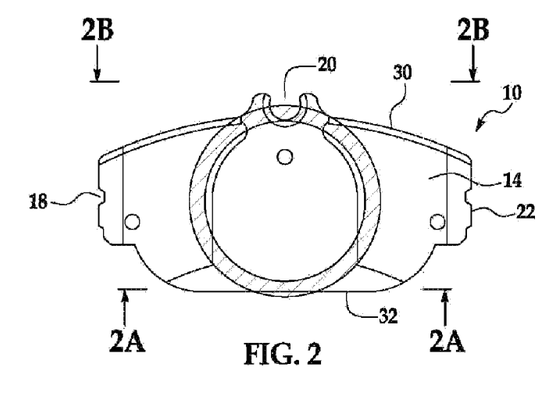
FIG. 2 is a plain view of the rear surface of a backing plate in accordance with another exemplary embodiment of the present invention.

In the present non-limiting exemplary embodiment, rear side 14 of backing plate 10 is provided with mounting notches 18, 20, 22, which are used to mount the backing plate in place in the caliper assembly in some implementations of the invention. In a typical caliper assembly (not shown), a caliper is fitted with pistons that press a pair of brake pads toward opposite surfaces of a rotating rotor or drum. In the present exemplary embodiment, because the piston that is conventionally used in a caliper assembly is cylindrical, rear side 14 of backing plate 10 is provided with an annular piston contact area 40 having a thickness equal to the annular cross-section of the piston.

Exemplary backing plate 10 further includes a first edge 30 and a second edge 32, and each vent channel 16 provides fluid communication therethrough and extends between front side 12 and rear side 14 from a first vent channel opening at first edge 30 toward a corresponding second vent channel opening at second edge 32. In other words, the vent channels, openings or paths extend and are disposed between two sides of the backing plate (e.g., 12 and 14) and extend all the way through to two other sides or edges (e.g., 30 and 32) thus, the openings are only on two sides of the backing plate. Of course, other configurations are contemplated as long as the desired effect is achieved. The vent channels 16 may be formed in any cross-sectional shape including, but not limited to, oval, rectangular, circular, square, polygonal, and oblong variations thereof, for example. Likewise, the first edge 30 and the second edge 32 may also be formed in any cross-sectional shape including, but not limited to, those mentioned above.

Figure 2A:
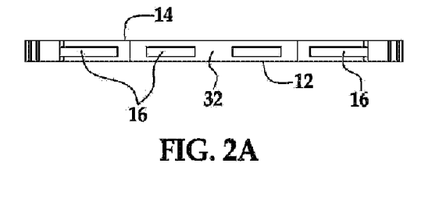
FIG. 2a is a view along lines 2a-2a of FIG. 2.
Figure 2B:
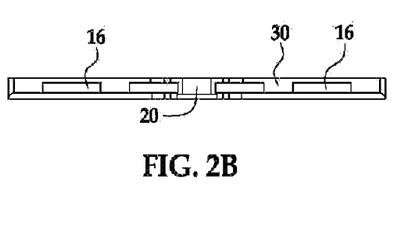
FIG. 2b is a view along lines 2b-2b of FIG. 2.
Figure 3B:
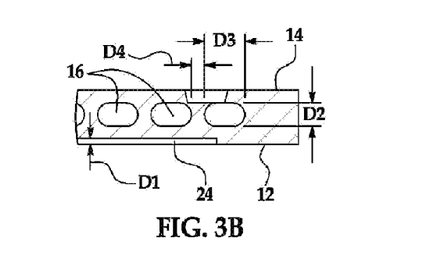
Figure 3C:
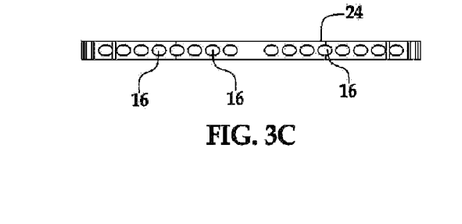
FIG. 3c is a view along lines 3c-3c of FIG. 3.

In the non-limiting exemplary embodiments illustrated in FIGS. 1, 3, and 4, vent channels 16 are provided in the shape of a rounded rectangle, which consists of two congruent semicircles and two equal and parallel lines. In the non-limiting exemplary embodiment illustrated in FIG. 3b, vent channels 16 are about 0.20 inches wide (D2) and about 0.11 inches tall (D3), measured at the widest and tallest points, and the distance between adjacent channels is about 0.06 inches (D4). The dimensions above may, of course, be increased, decreased, and otherwise varied as desired in accordance with exemplary embodiments of the present invention. For example, referring now to FIGS. 2a and 2b, which depicts edges of a backing plate in accordance with one non-limiting exemplary embodiment of the present invention, a backing plate having vent channels 16 in the shape of a regular rectangle is illustrated.

In non-limiting exemplary embodiments, backing plate 10 can be about 2 to about 15 inches wide (about 4.9 inches in one specific embodiment) and about 1 to about 6 inches tall (about 2.6 inches in one specific embodiment), measured at the widest and tallest points. The thickness can be about 0.150 to about 0.400 inches (and about 0.26 inches in one specific embodiment), measured from front side 12 to rear side 14. Surface 24 can be about 0.02 to 0.10 inches deep (and about 0.03 inches in one specific embodiment), as measured from front side 12 to front surface 24 (D1). With respect to these and other dimensions of exemplary embodiments of backing plates in accordance with the present invention, the overall size can depend on the intended application, as will the size and shape of the vent channels. In other words, the particular dimensions illustrated in the accompanying drawings and described herein are provided as non-limiting exemplary embodiments, and it is contemplated that the overall backing plate dimensions may be increased, decreased, and otherwise varied as desired in accordance with exemplary embodiments of the present invention.

Figure 5:
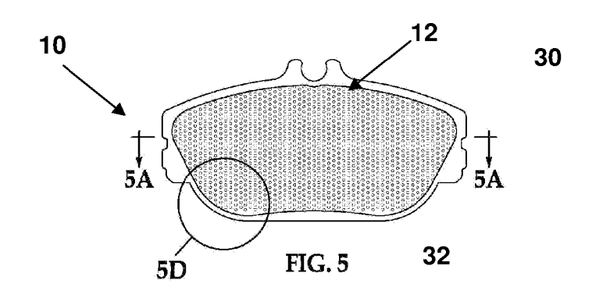
FIG. 5-5D are views similar to FIGS. 1-4d.
Figures 5A, 5B, 5C:
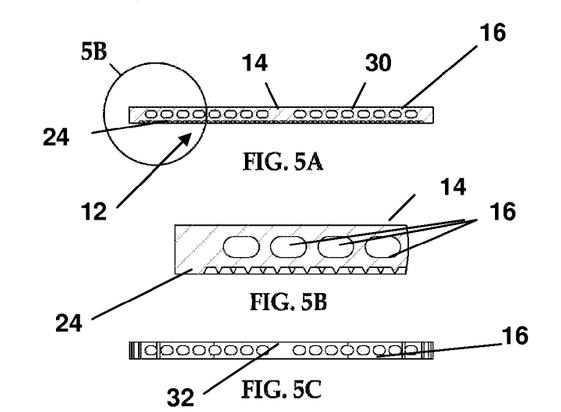
Figure 5D:
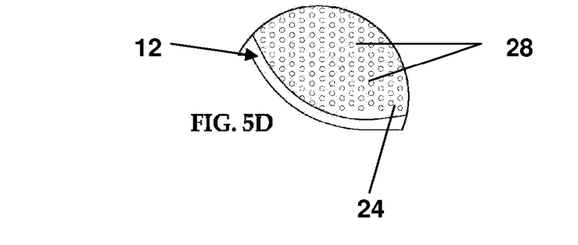
Figure 6:
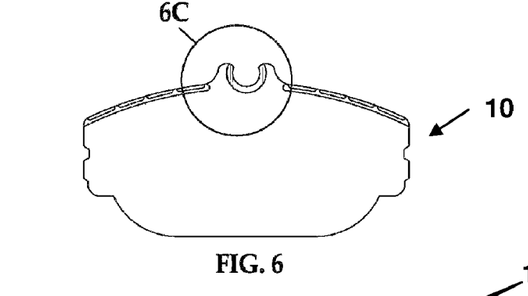
FIG. 6-6D illustrate another alternative non-limiting exemplary embodiments of the present invention.
Figures 6A, 6B, 6C, 6D:
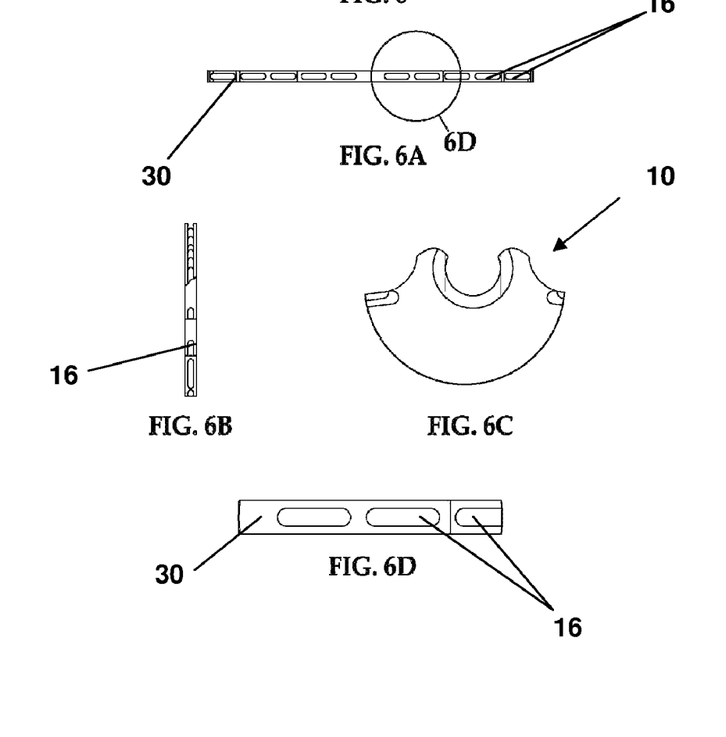
Figure 7:
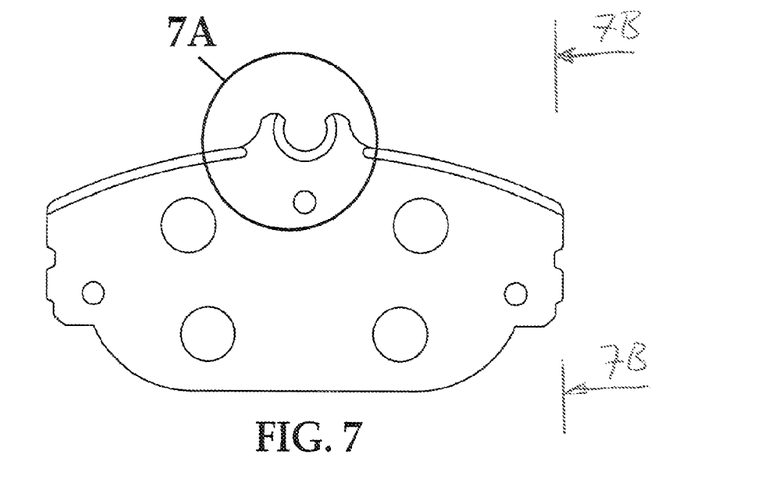
Figure 7A:
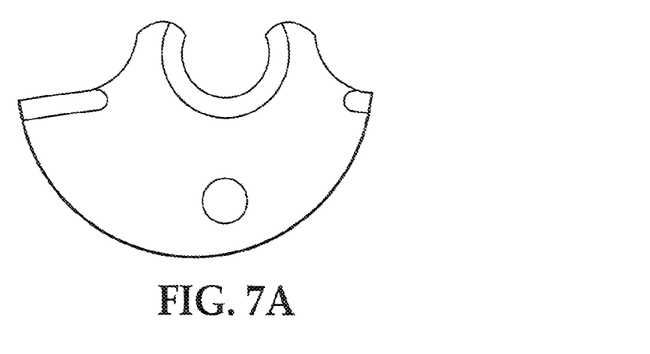
Figure 7B:
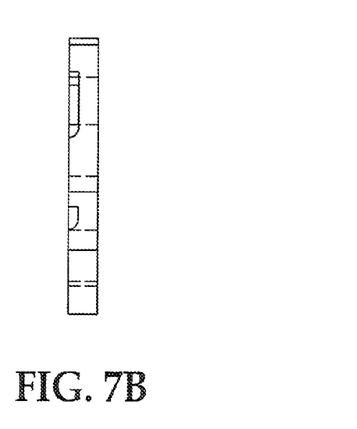

Referring now to FIGS. 5 and 6, additional non-limiting exemplary embodiments of backing plates in accordance with the present invention are illustrated.

In exemplary embodiments, the backing plate can be comprised of a metal such as, for example, stainless steels, alloy steels, and soft magnetic materials, controlled expansion materials, and custom alloys, and can be formed by any suitable process such as metal injection molding (MIM), thixotropic injection molding (TXM), and liquid metal injection molding. In one non-limiting exemplary embodiment, the backing plate can be formed by an MIM process that involves combining fine metal powders with plastic and wax binders that allow the metallic material to be injected into a mold. Solvent and thermal processes may then be used remove the binders, and the resultant metal part is sintered at temperatures great enough to bind the particles but not melt the metal. With its inherent design flexibility and cost efficiency, MIM can permit the vent channels to be integrally molded as part of a backing plate in a wide range of geometries as the dies used for the MIM process or any other process are configured to provide the vent apertures passing through the backing plate. Non-limiting examples of apparatuses and methods for a MIM process are presented in U.S. Pat. Nos. 5,985,208, 5,993,507, 6,669,898, and 6,676,895, the contents of each of which are incorporated herein by reference thereto.

In alternative exemplary embodiments, a liquid metal injection molding process can be used to form the backing plate. A non-limiting example of an apparatus and method for a liquid metal injection process is presented in U.S. Pat. Nos. 6,942,006 and 7,017,645, the contents of each of which are incorporated herein by reference thereto. In this process, also similar to plastic injection molding, the metal to be injected is first heated above its liquidus temperature and then forced into the mold by the extension of a piston in the injection chamber. This process utilizes metal alloys that solidify into an amorphous structure with low cooling rates at which crystallization is avoided, such as those containing zirconium, nickel, copper, iron, titanium, palladium, platinum, and gold. Certain alloys of this class contain beryllium as a secondary constituent. Among these are alloys that contain zirconium and titanium in combination with beryllium, copper and nickel. Alloys of this class are available from Amorphous Technologies International (Laguna Niguel, Calif. USA) and Liquidmetal Technologies (Tampa, Fla., USA). The cooled metal alloys are essentially frozen liquids with amorphous atomic structure formed through bypassing crystallization during solidification. These alloys can be at least twice as strong as conventional steel alloys, retain the malleability of plastic, and are relatively non-corrosive and wear-resistant.

In yet other alternative exemplary embodiments, a thixotropic injection molding process can be used to form the backing plate. Non-limiting examples of apparatuses and methods for a thixotropic injection process are presented in U.S. Pat. Nos. 5,040,589, 6,745,818, 6,739,379, and 6,787,899, the contents of each of which are incorporated herein by reference thereto. Also similar to plastic injection molding, TXM is a simpler, one-step process carried out in a closed machine without the need for binders, resins, or sintering. In this process, a metal, typically comprising magnesium, aluminum, and zinc alloys, is first heated to a thixotropic (that is, semi-solid) state, and then injected under pressure into a mold from an injection chamber. As semi-solid metal has high viscosity, small shrinkage, and good fluidity, cast products can be produced with improved near net-shape and less porosity. A screw with a shaft portion that is attached to a drive mechanism can be used to inject the metal into the mold. The drive mechanism is typically a motor, but hydraulic mechanisms can also be used.

Significant advantages are presented by using the backing plate having structural and functional characteristics in accordance with exemplary embodiments of the present invention. First, the radially or otherwise disposed vent channels extending through the backing plate cause the backing plate to achieve a natural frequency or steady state that substantially attenuates vibrational forces passing by the brake pad, which arise during braking and may cause noise or "brake squeal". The natural vibration frequency of any body, at which the body goes into resonance, is inversely proportional to the moment of inertia of the body. In a backing plate formed in accordance with exemplary embodiments of the present invention, the vent channels are such that the backing plate adopts natural vibration frequencies that cannot substantially be excited. Because the backing plate is thus substantially unable to either excite or transmit the vibration, it represents a vibration-damping element that effectively suppresses brake noise. Thus, the chain of vibrating elements that is established during brake squeal is broken.

More specifically, energy is supplied to the backing plates by various stimuli, called exciters, which cause the backing plates to vibrate. A vibrating backing plate creates undesirable noise by transmitting the vibrations to vehicle occupants through the surrounding air or through the structure of the vehicle. A backing plate has a natural or resonant frequency at which it tends to vibrate the most when provided with a predetermined amount of energy by an exciter. Many exciters impart energy to a backing plate having amplitude peaks at particular frequencies such that they tend to cause the backing plate to vibrate the most at these frequencies. If a backing plate's resonant frequency coincides with the peak excitation frequencies, the backing plate's vibrations will be maximized, as will the undesirable noise or "brake squeal".

Another advantage provided by exemplary embodiments of the present invention is that the overall weight of the backing plate is reduced through the incorporation of the channels passing through the backing plate. Moreover, the amount of material required for a backing plate is also reduced due to the plurality of fluid channels extending therethrough.

A backing plate's resonant frequency is determined by many inflexible variables including the peripheral shape of the backing plate, the backing plate material, and the material thickness. These variables typically cannot be significantly adjusted because they are constrained by design parameters of the backing plate and the system it is used in and therefore there is little flexibility in the adjustment of the backing plate's resonant frequency. Forming a backing plate with vent channels in accordance with exemplary embodiments of the present invention, however, desirably allows the resonant frequency of the backing plate to be moved away from the amplitude peaks of the exciters to reduce noise by changing the mass and geometry of the backing plate through the incorporation of the vent channels. The number and location of the vent channels, and the size, shape, and spacing of such vent channels, all contribute in determining a backing plate's resonant frequency, and can be varied in exemplary embodiments in accordance with the present invention to achieve a desired resonant frequency.

Another significant benefit provided by backing plates formed in accordance with exemplary embodiments of the present invention is a significant reduction in the heat that is generated from the frictional forces of braking and absorbed by the brake assembly. It is important to dissipate the heat and cool the brake assembly before, during and after use (e.g., use being defined as application of the friction material to the rotating body, e.g., a rotor) as excessive temperatures reduce braking performance, create longer stopping distances, and shorten the life of the brake assembly. A backing plate in accordance with exemplary embodiments of the present invention is less weighty than a conventional backing plate, which is beneficial because the heat generated by braking action increases with the weight of the brake pad. Further, the backing plate, by way of air or fluid moving through the plurality of vent channels, is cooled because the "ventilation" absorbs the heat from the braking action and carries it away.

By way of example, but not limitation, while the exemplary backing plates illustrated in FIGS. 1-6 are well suited for automotive applications, exemplary embodiments of the present invention can be implemented for other brake pad configurations, such as those employed in other systems requiring a backing plate such as trains and other rail-based vehicles, planes, large trucks and construction vehicles, aerospace applications and any other vehicle or apparatus in which brake pads are employed.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims and their legal equivalence. The scope of the invention also includes any combination of the elements from the various species and embodiments disclosed in the specification that are not already described. It is intended that the scope of the present invention extend to all such modifications and/or additions and that the scope of the present inventions is limited solely by the claims set forth below.

What is claimed is:

1. A backing plate for a disc brake pad, comprising:
   a single and only a single molded unitary structure, the single molded unitary structure having:
   a generally planar front side defining an upper surface of the backing plate, the front side being configured to engage a friction material;
   a rear side opposite the front side, the rear side being configured to engage a caliper assembly;
   an outer exterior perimeter defining a periphery of the single molded unitary structure, the outer exterior perimeter having an integral surface extending from the front side to the rear side;
   a first peripheral edge defining a portion of the outer exterior perimeter;
   a second peripheral edge defining another portion of the outer exterior perimeter, the second peripheral edge generally opposing the first peripheral edge; and a plurality of channels disposed between the front side and the rear side and extending from the first peripheral edge toward the second peripheral edge, wherein the channels are completely surrounded by the front side and the rear side of the single molded unitary structure such that the channels extend through the single molded unitary structure to have openings at only the integral surface of the exterior perimeter at at least two discrete locations, and wherein the channels are sized and configured to impart to the backing plate a resonant frequency that attenuates vibration.

2. The backing plate according to claim 1, wherein the channels of the plurality of channels have a cross-sectional shape selected from the group consisting of rectangular, ovular, rounded rectangular, circular, square, polygonal, and oblong.

3. The backing plate according to claim 1, wherein the rear side includes mounting notches configured to mount the backing plate in a caliper assembly.

4. The backing plate according to claim 1, wherein a support surface is recessed relative to the front side and includes a bonding structure for retaining friction material.

5. The backing plate according to claim 4, wherein the bonding structure is selected from the group consisting of adhesives, rivets, holes, and bosses.

6. The backing plate according to claim 1, wherein the single molded unitary structure is formed from a metal selected from the group consisting of titanium, aluminum, aluminum alloy, stainless steel, steel, ductile iron, and cast iron.

7. The backing plate according to claim 1, wherein the single molded unitary structure is formed by a metal injection molding process.

8. A method of manufacturing a backing plate for a disc brake pad, comprising:
   forming a single and only a single molded unitary structure with a metal injection molding process, the single molded unitary structure having a planar front side configured to engage a friction material, a rear side configured to engage a caliper assembly, an outer exterior perimeter defining a periphery of the single molded unitary structure, the outer exterior perimeter having an integral surface extending from the front side to the rear side, a first peripheral edge defining a portion of the outer exterior perimeter, and a second peripheral edge defining another portion of the outer exterior perimeter, the second peripheral edge opposing the first peripheral edge, wherein a plurality of channels are integrally formed in the single molded unitary structure and the plurality of channels are completely surrounded by the planar front side and the rear side of the backing plate such that the plurality of channels each extend through the backing plate from the integral surface of the outer exterior perimeter from the first peripheral edge to the second peripheral edge, wherein the plurality of channels are open only at the integral surface of the outer exterior perimeter,
   the method further comprising sizing and configuring the channels so as to impart to the backing plate a resonant frequency that attenuates vibration.

9. The method of claim 8, wherein the metallic material used to form the single molded unitary structure is selected from the group consisting of stainless steels, alloy steels, and soft magnetic materials, controlled expansion materials, and custom alloys.

10. The method as in claim 8, wherein the plurality of channels are vent channels.

11. The method as in claim 8, wherein at least one of the first and second peripheral edges is curved.

12. The method as in claim 11, wherein the plurality of channels are vent channels.

13. The backing plate as in claim 1, wherein the plurality of channels are vent channels.

14. The backing plate as in claim 1, wherein at least one of the first and second peripheral edges is curved.

15. The backing plate as in claim 14, wherein the plurality of channels are vent channels.

* * * * *